US011241654B2

(12) United States Patent
Kennedy et al.

(10) Patent No.: US 11,241,654 B2
(45) Date of Patent: Feb. 8, 2022

(54) MINERAL CARBONATION

(71) Applicant: Mineral Carbonation International Pty Ltd, Braddon (AU)

(72) Inventors: Eric Miles Kennedy, Newcastle (AU); Michael Stockenhuber, Maitland (AU); Timothy Kenilworth Oliver, Adamstown Heights (AU); Emad Benhelal, Wallsend (AU); Mark Stuart Rayson, Bar Beach (AU); Geoffrey Frederick Brent, Valentine (AU)

(73) Assignee: Mineral Carbonation International Pty Ltd, Braddon (AU)

( * ) Notice: Subject to any disclaimer, the term of this patent is extended or adjusted under 35 U.S.C. 154(b) by 0 days.

(21) Appl. No.: 17/053,109

(22) PCT Filed: May 8, 2019

(86) PCT No.: PCT/AU2019/050423
§ 371 (c)(1),
(2) Date: Nov. 5, 2020

(87) PCT Pub. No.: WO2019/213704
PCT Pub. Date: Nov. 14, 2019

(65) Prior Publication Data
US 2021/0069641 A1 Mar. 11, 2021

(30) Foreign Application Priority Data
May 8, 2018 (AU) ................. 2018901561

(51) Int. Cl.
*C01F 5/24* (2006.01)
*B03C 1/035* (2006.01)
*B01D 53/62* (2006.01)
*B01D 53/75* (2006.01)
*B01D 53/78* (2006.01)
*B01D 53/80* (2006.01)

(52) U.S. Cl.
CPC ............ *B01D 53/62* (2013.01); *B01D 53/75* (2013.01); *B01D 53/78* (2013.01); *B01D 53/80* (2013.01); *B03C 1/035* (2013.01); *C01F 5/24* (2013.01); *B01D 2251/402* (2013.01); *B01D 2257/504* (2013.01); *B01D 2258/0283* (2013.01); *B01D 2259/128* (2013.01)

(58) Field of Classification Search
CPC .. B01D 53/62; B01D 53/80; B01D 2251/402; B01D 2257/504; B01D 2258/0283; Y02C 20/40; Y02E 20/32; Y02E 20/34
See application file for complete search history.

(56) References Cited

U.S. PATENT DOCUMENTS 8,617,500 B2 * 12/2013 Gartner .............. B01D 53/1475
423/230
9,440,189 B2 9/2016 Mercier et al.
10,857,503 B2 * 12/2020 Hunwick ............... B01D 53/80

FOREIGN PATENT DOCUMENTS

WO 2006008242 A1 1/2006

OTHER PUBLICATIONS

International Search Report for Application No. PCT/AU2019/050423 dated Jun. 11, 2019, 3 pages.
O'Connor et al., "Aqueous Mineral Carbonation: Mineral Availability, Pre-Treatment, Reaction Parametrics and Process Studies", DOE/ARC-TR-04-002, Albany Research Center, Albany, OR, USA, 2005, 463 pages.
Pasquier, L. et al., "Parameters Optimization for Direct Flue Gas CO2 Capture and Sequestration by Aqueous Mineral Carbonation Using Activated Serpentinite Based Mining Residue", Applied Geochemistry, vol. 50, 2014, pp. 66-73.
Werner et al., "Flue Gas CO2 Mineralization Using Thermally Acitivated Serpentine: From Single-To_Double Step Carbonation", Physical Chemical Physics, vol. 16, 2014, 6 pages.

* cited by examiner

*Primary Examiner* — Timothy C Vanoy
(74) *Attorney, Agent, or Firm* — Howard & Howard Attorneys PLLC

(57) ABSTRACT

An integrated process for carbon dioxide capture, sequestration and utilization, includes a) providing an aqueous slurry with a particulate solid including an activated magnesium silicate mineral; b) contacting a $CO_2$-containing gas stream with the aqueous slurry to provide a slurry comprising a magnesium ion enriched carbonated aqueous liquid and a magnesium depleted solid residue; c) subjecting at least part of the magnesium depleted solid residue to a particle size classification process that separates the magnesium depleted solid residue into a fine particle size fraction and a coarse particle size fraction; d) subjecting the coarse particle size fraction to a particle size reduction process; e) providing an aqueous slurry comprising particle size reduced fraction from step d) and repeating step b), wherein this step e) does not include using fine particle size fraction from step c); and f) precipitating magnesium carbonate from magnesium ions dissolved in b) and e).

Figure 1:
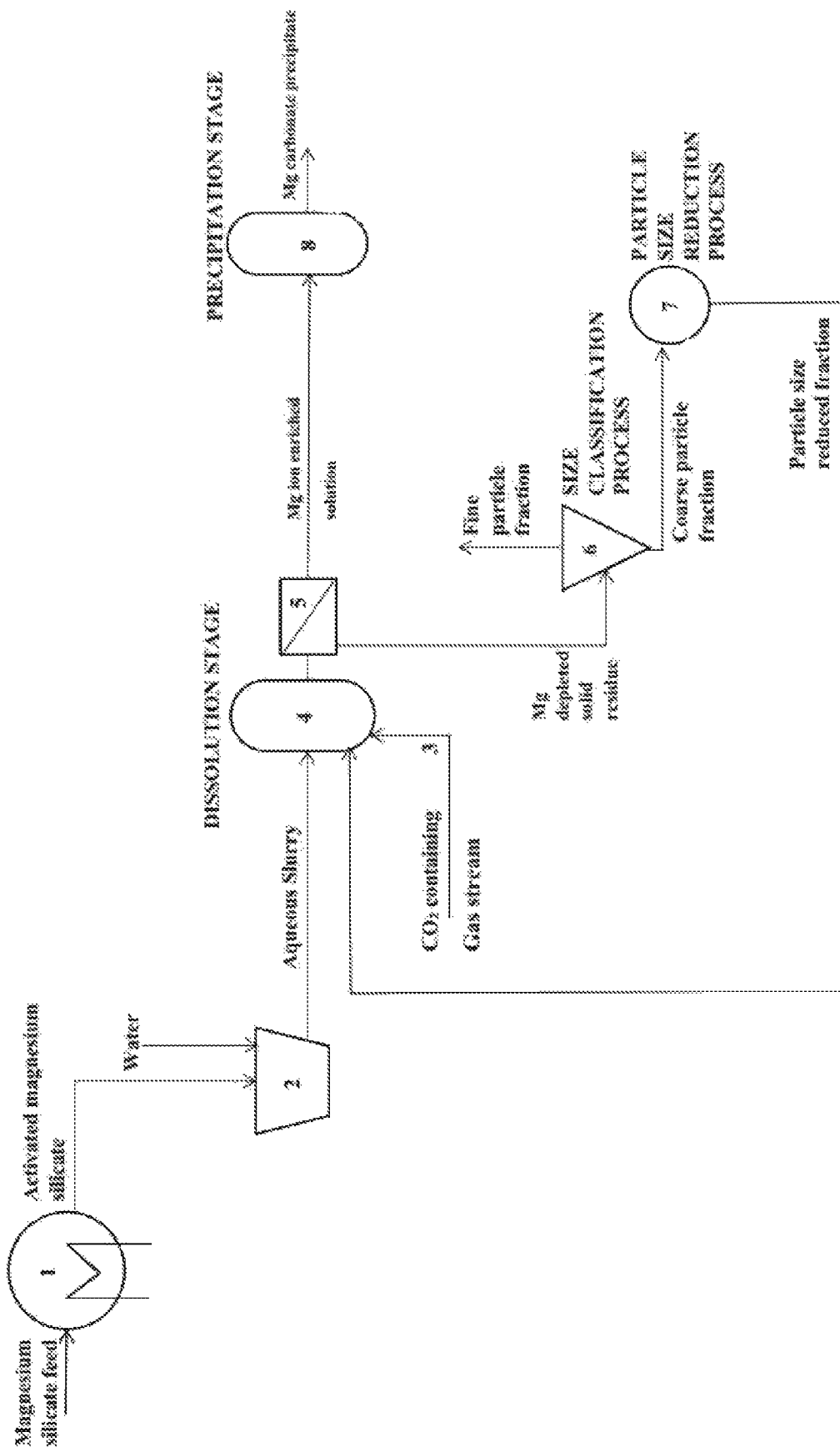

20 Claims, 5 Drawing Sheets

MINERAL CARBONATION

CROSS-REFERENCE TO RELATED APPLICATIONS

This application is the National Stage of International Patent Application No. PCT/AU2019/050423, filed on May 8, 2019, which claims priority to and all the advantages of Australian Patent Application No. 2018901561, filed on May 8, 2018, the contents of which are incorporated herein by reference.

FIELD OF THE INVENTION

The present invention relates to a process for carbon dioxide capture, sequestration and utilisation (CCSU) and to a reactor system suitable for implementing the process.

BACKGROUND TO THE INVENTION

The sequestration of carbon dioxide gas in repositories that are isolated from the atmosphere is a developing technology that is widely recognised as an essential element in global attempts to reduce carbon dioxide emissions to the atmosphere. The rapid increase in atmospheric carbon dioxide concentrations is of concern due to its properties as a greenhouse gas and its contribution to the phenomena of global warming and climate change. Prototype demonstration facilities for carbon dioxide capture and sequestration (CCS) exist in several countries and commercial scale operations have recently also emerged. While various technologies exist for the capture and concentration of carbon dioxide from combustion flue gases, such as in coal combustion for electrical power generation, most current facilities utilise underground sequestration by injection of pressurised carbon dioxide into suitable underground repositories. This is commonly known as geosequestration. This may occur in depleted oil or gas reservoirs or other underground porous formations that are suitably isolated from the atmosphere. These reservoirs or formations may be situated under land or sea. Another possible subterranean repository for carbon dioxide gas is so-called saline aquifers. Direct storage of carbon dioxide on the floor of the deep ocean has also been investigated but has yet to be successfully demonstrated on any significant scale.

Another field of study for carbon dioxide sequestration is that known as mineral carbonation, whereby carbon dioxide is chemically reacted with alkali or alkaline-earth metal oxide or silicate minerals to form stable solid carbonates. This approach is known as ex-situ mineral carbonation, as opposed to in-situ carbonation whereby carbon dioxide is deposited into underground mineral formations and reacts over longer timeframes with suitable minerals in existing underground formations. The present invention is concerned with the ex-situ approach to carbon dioxide sequestration via mineral carbonation of silicate minerals to form carbonates.

Mineral carbonation has many potential advantages over other methods of carbon dioxide sequestration. These include permanence and stability of the formed carbonates and the elimination of any risks of leakage of carbon dioxide gas. Furthermore, suitable subterranean sites for geosequestration do not exist at all locations where they are required near to carbon dioxide emission sources. The chemical reactions of mineral carbonation are also thermodynamically favoured, with an exothermic release of energy due to the formation of the carbonates. The raw silicate minerals required for mineral carbonation are abundant and widely distributed globally. These minerals may be readily mined and subjected to known comminution and other processing technologies. They are generally benign and the environmental and safety risks are readily manageable. In particular, the magnesium silicate mineral broadly known as serpentinite has been estimated to be available in quantities sufficient to sequester all global emissions of carbon dioxide from known fossil fuel reserves.

So-called single stage carbonation processes such as that described by O'Connor et al., 2005-Aqueous Mineral Carbonation: Mineral Availability, Pre-treatment, Reaction Parametrics and Process Studies, DOE/ARC-TR-04-002-Albany Research Center, Albany, Oreg., USA, comprise the dissolution of magnesium from the activated mineral and precipitation of magnesium carbonate within a single stage, thereby producing a mixture of unreacted mineral, magnesium carbonate and silica. This mixture is difficult to separate into viable products. The extent of conversion of magnesium to magnesium carbonate is also limited.

So-called two stage or multi stage carbonation processes comprise separate magnesium dissolution and magnesium carbonate precipitation stages. The magnesium dissolution stage uses a carbon dioxide ($CO_2$) containing gas stream. Various workers have described such processes, including Mercier et al. (U.S. Pat. No. 9,440,189B2) and Werner et al., Flue gas $CO_2$ mineralization using thermally activated serpentine: from single- to double-step carbonation, Physical Chemistry Chemical Physics 16 (2014) 24978-24993.

Existing multi-stage processes for carbonation of mineral ores using $CO_2$ as an acid source for dissolution are not capable of significant leaching of magnesium from the solid mineral, and thus are relatively inefficient as a significant fraction of magnesium is not utilised for reaction with $CO_2$. This increases process costs as larger amounts of mineral must be processed due to the underutilisation of magnesium.

Against this background it would be desirable to provide a new integrated process that sequesters $CO_2$ into carbonate and produces silica rich products in a more efficient manner than previously described.

SUMMARY OF THE INVENTION

The present invention seeks to provide a process for the permanent and safe capture and sequestration of carbon dioxide gas while producing products of economic value. The present invention is particularly concerned with an efficient and economically viable integrated process for the chemical conversion of carbon dioxide and magnesium silicate feedstocks to solid carbonates and silicates thereby enabling a reduction in the amount of carbon dioxide discharged to the atmosphere while simultaneously producing products of economic utility and value, in particular magnesium carbonates and silica. This utilisation of products categorises the process of the invention as carbon dioxide capture, sequestration and utilization (CCSU), as opposed to CCS.

The present invention provides an integrated process for carbon dioxide capture, sequestration and utilisation, which comprises:

a) providing an aqueous slurry comprising an aqueous liquid and a particulate solid comprising an activated magnesium silicate mineral;

b) in a dissolution stage, contacting a $CO_2$-containing gas stream with the aqueous slurry to dissolve magnesium from the mineral to provide a slurry comprising a magnesium ion enriched carbonated aqueous liquid and a magnesium depleted solid residue;

c) subjecting at least part of the magnesium depleted solid residue from step b) to a particle size classification process that separates the magnesium depleted solid residue into a fine particle size fraction and a coarse particle size fraction;

d) subjecting at least part of the coarse particle size fraction from step c) to a particle size reduction process to provide a particle size reduced fraction;

e) providing an aqueous slurry comprising a particle size reduced fraction from step d) and repeating step b), wherein this step e) does not include using fine particle size fraction from step c); and f) in a precipitation stage, precipitating magnesium carbonate from magnesium ions dissolved in b) and e).

The present invention also provides a reactor system adapted to perform the processes of the present invention. The reactor system comprises one or more dissolution reactors, one or more precipitation reactors, one or more particle size classifiers and one or more particle size reduction devices.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that prior publication (or information derived from it) or known matter forms part of the common general knowledge in the field of endeavor to which this specification relates.

BRIEF DISCUSSION OF DRAWINGS

Figure 2:
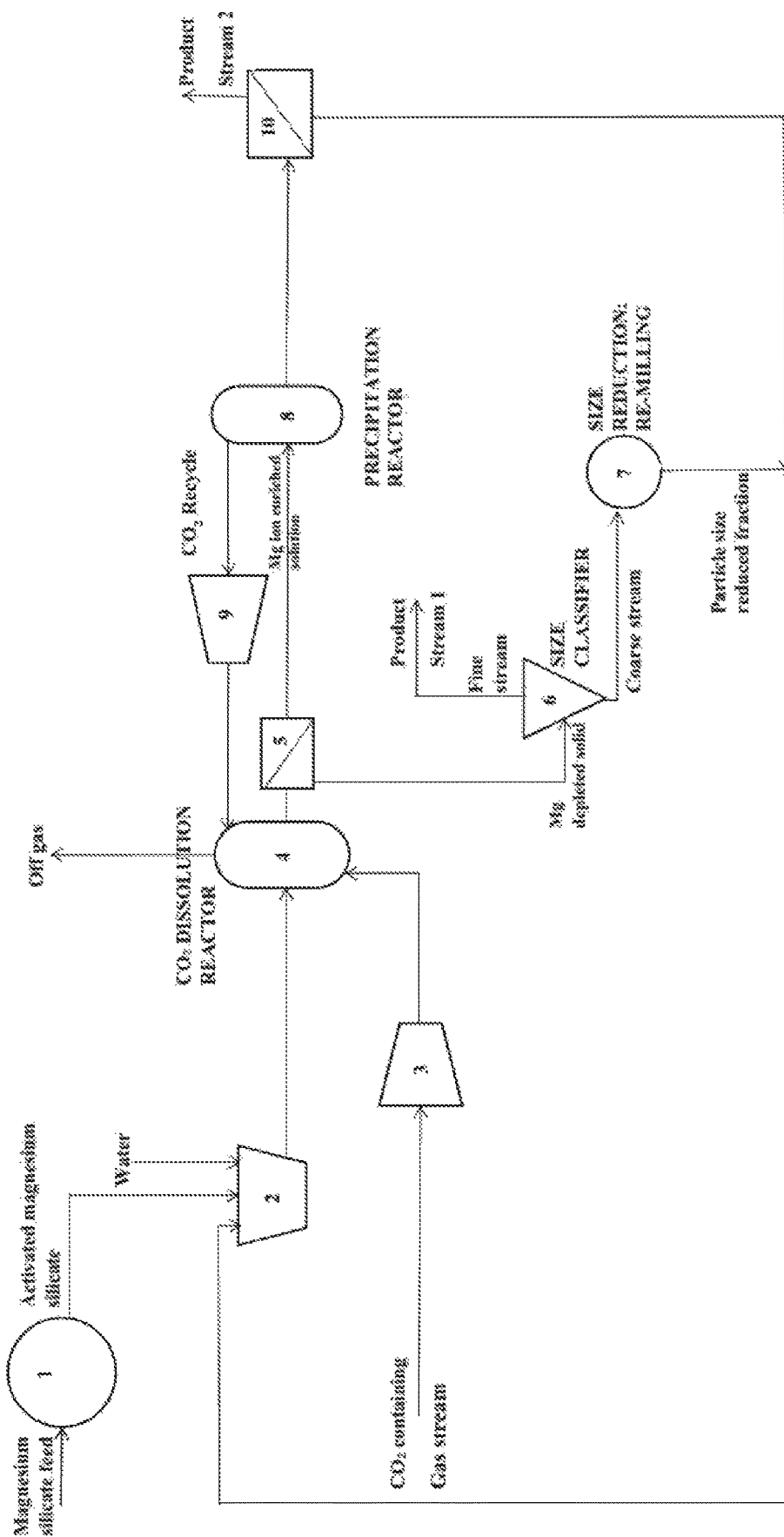
Figure 3:
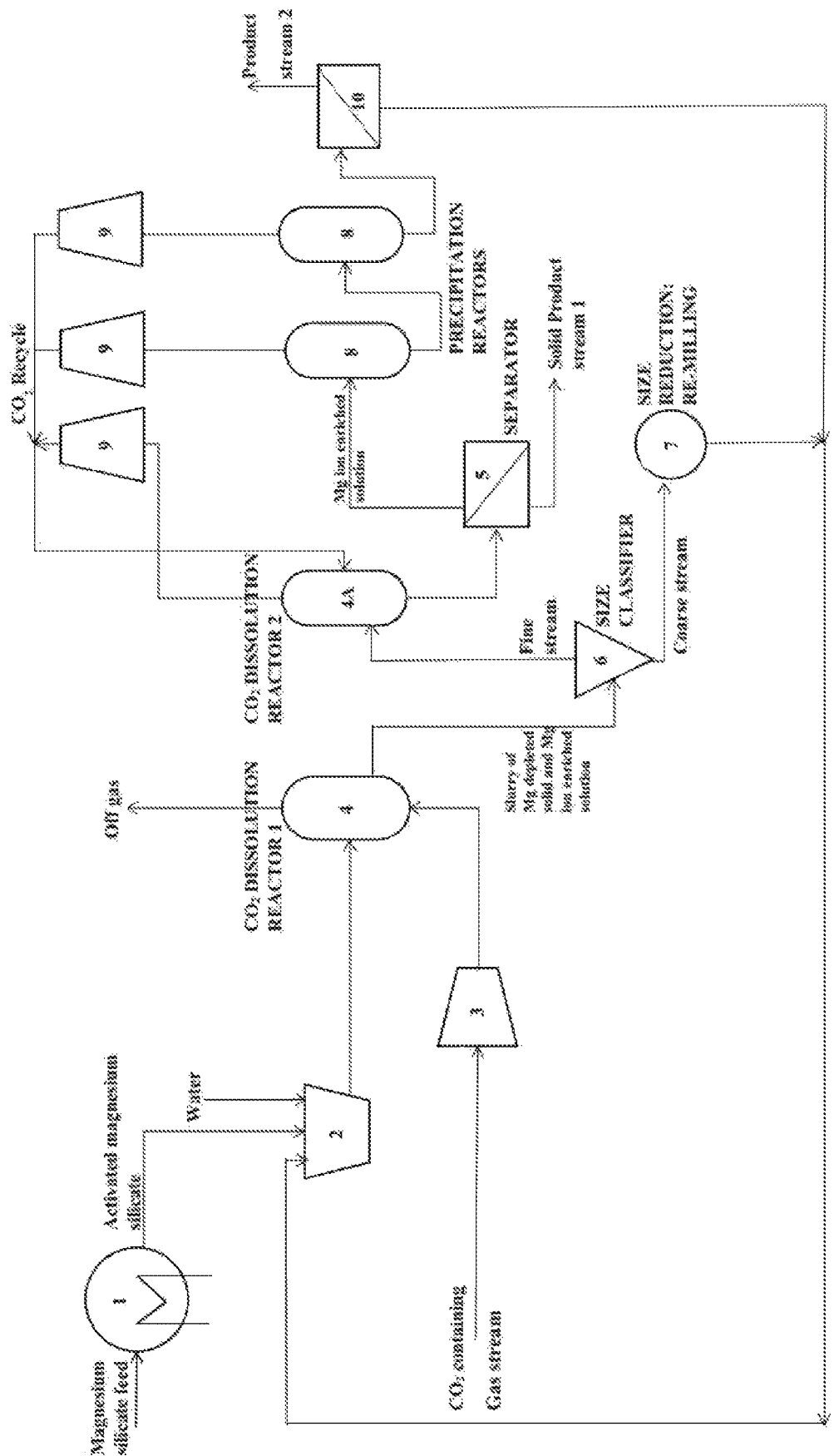
Figure 4:
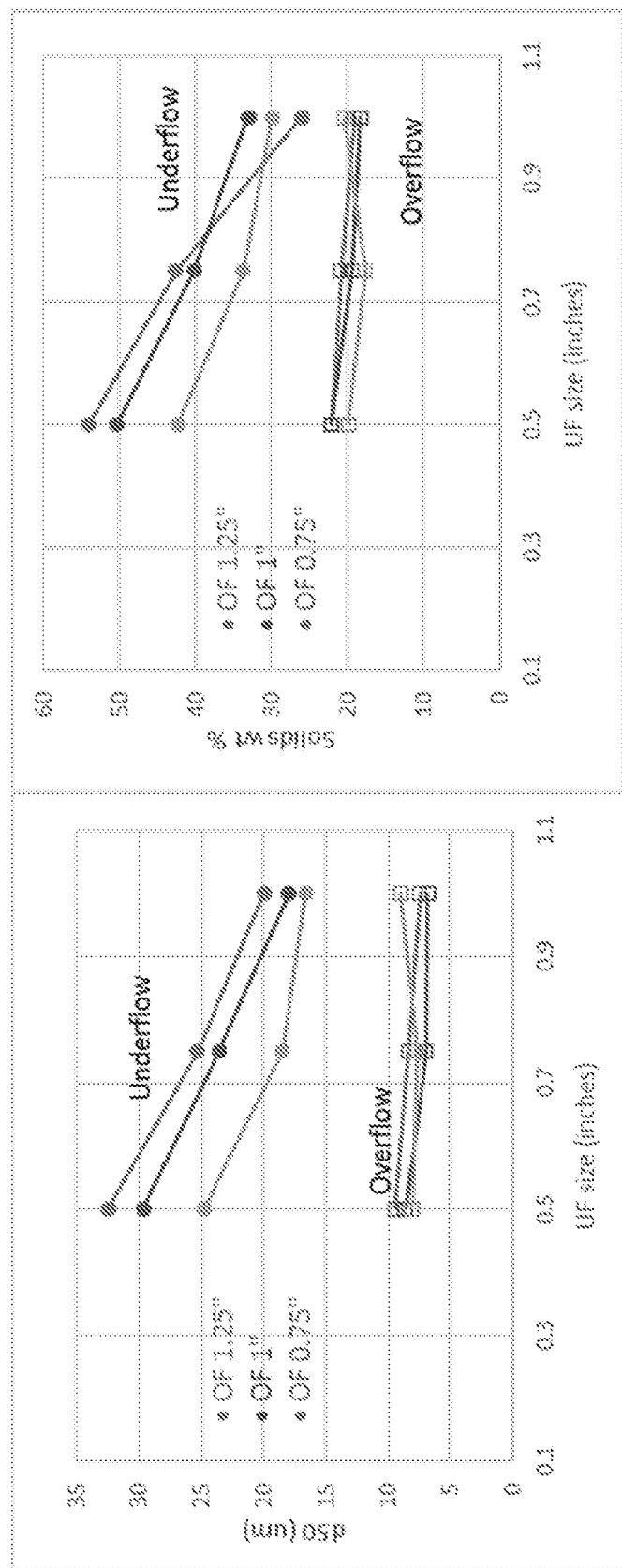
Figure 5:
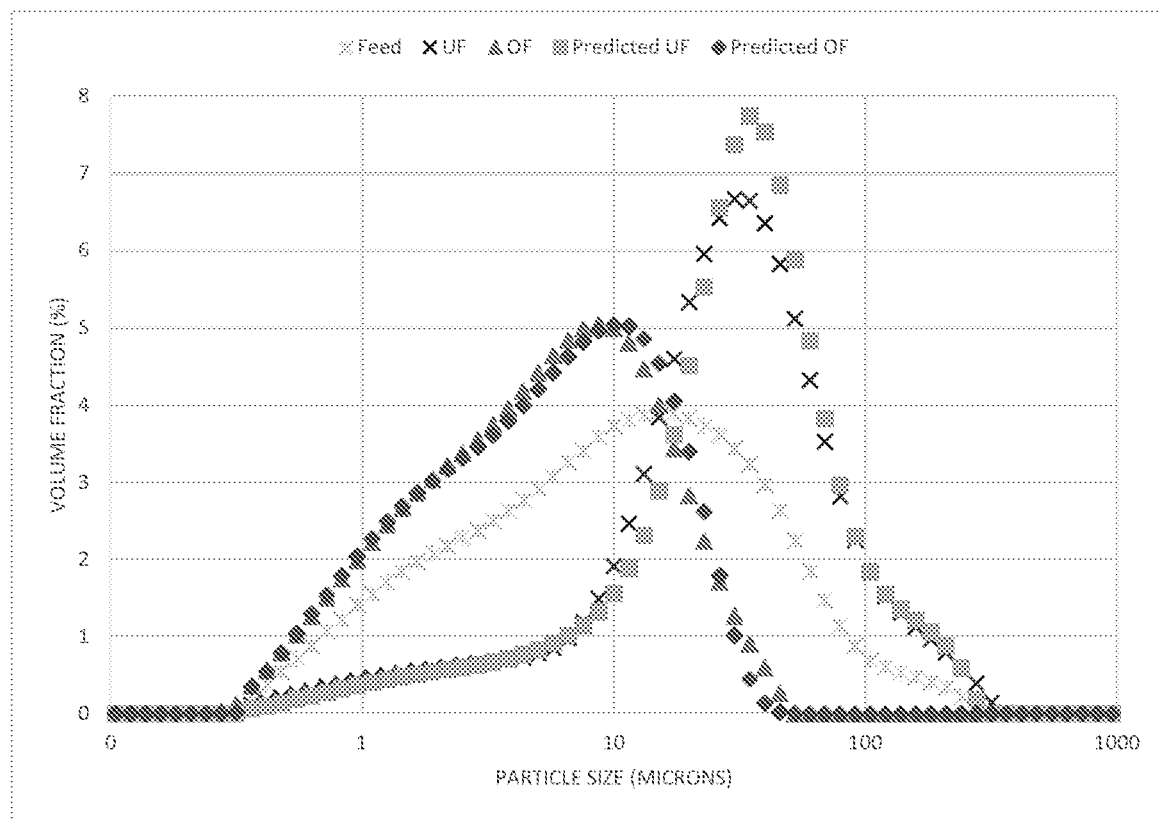

Embodiments of the present invention are illustrated with reference to the accompanying non-limiting drawings in which FIG. 1 is a flowsheet illustrating the process of Example 1, FIG. 2 is a flowsheet illustrating the process of Example 2, FIG. 3 is a flowsheet illustrating the process of Example 3 and FIGS. 4 and 5 illustrate results from Example 4.

DETAILED DISCUSSION OF THE INVENTION

In accordance with the invention magnesium ions are provided in aqueous liquid by dissolution from activated mineral in particulate form. The invention employs steps that are intended to increase the amount of magnesium that is dissolved from the mineral and thus increase the relative amount of magnesium ions available for precipitation as magnesium carbonate in a subsequent precipitation stage.

The present invention employs an initial dissolution stage in which an aqueous slurry containing an activated magnesium silicate mineral (in particulate form) is contacted with a $CO_2$-containing gas stream. This dissolves magnesium from the mineral to provide a slurry comprising a magnesium ion enriched carbonated aqueous liquid and a magnesium depleted solid residue. The invention involves subsequent processing of the magnesium depleted solid residue in order to further dissolve magnesium from it. Thus, the magnesium depleted solid residue is subjected to a particle size classification process that results in the solid residue being partitioned into a coarse particle size fraction and a fine particle size fraction. The coarse particle size fraction is then processed to reduce the average particle size to yield a particle size reduced fraction in a size reduction process. The particle size reduced fraction is then subjected to a dissolution reaction to produce an aqueous liquid comprising magnesium ions. The fine particle size fraction from the particle size classification process is not returned to the initial dissolution stage but may be recovered as a final product or sent to another dissolution stage where the $CO_2$ concentration is higher than that in the initial dissolution stage. Two major advantages are provided by this. First, the fine particle size fraction is not sent to the size reduction process thereby reducing the load on that process by only subjecting the coarse fraction to size reduction. Second, the fine particle size fraction will have had much of its magnesium already dissolved out in the initial dissolution stage and as such may either constitute a silica rich useful final product or, by sending it to another dissolution stage where the $CO_2$ concentration is higher than that in the initial dissolution stage, the remaining recalcitrant magnesium can be more readily dissolved than in the initial dissolution stage. Magnesium dissolved in these dissolution stages, and possibly one or more additional dissolution stages, is used for precipitation of magnesium carbonate.

The process according to the invention may use in the initial dissolution stage a $CO_2$-containing gas stream from a flue gas, for example from a hydrocarbon combustion process or calcining process, or $CO_2$-containing stream from a chemical process such as oil refining. The concentration of $CO_2$ in such streams may be in the range 2-95% by volume, but more typically is in the range 2-60%, 2-50%, 2-40%, 2-30%, 2-20%, or 5-20% by volume excluding entrained water or water vapour. The concentration of $CO_2$ in the subsequent dissolution stage treating the fine particle size fraction may be higher, since it comprises recycled $CO_2$ that is released from the precipitation stage. This concentration may be in the range 40-100%, but more typically is in the range 50-100%, 60-100%, 70-100%, 80-100%, 90-100%, or 95-100% by volume, excluding entrained water or water vapour The initial dissolution reaction will yield magnesium ions and carbonate and bicarbonate counter ions in aqueous liquid. If distinct dissolution stages (reactors) are used the magnesium ion enriched aqueous liquid produced by each stage (reactor) may be combined prior to precipitation. However, this is not essential.

The significance of the particle size reduction process is that this increases the surface area to volume ratio of particles and also breaks up partially dissolved particles to expose mineral that was undissolved in the initial dissolution stage, thereby making available for (dissolution) reaction magnesium that was not otherwise available prior to particle size reduction.

In accordance with the invention the particle size reduced fraction can be returned to the initial dissolution stage or it can be processed separately in a distinct dissolution stage (i.e. in a distinct dissolution reactor). Dissolution of magnesium from the particle size reduced fraction may take place by the same or different type of reaction as the initial dissolution reaction in which the aqueous slurry (of an aqueous liquid and a particulate solid comprising an activated magnesium silicate mineral) is contacted with a $CO_2$-containing gas stream.

Benefits of the invention are achieved by using for precipitation of magnesium carbonate magnesium ion containing aqueous liquid(s) produced by dissolution of magnesium from the starting activated mineral feedstock and by dissolution of magnesium from the particle size reduced fraction. Thermodynamic considerations will determine the extent to which magnesium can be precipitated as magnesium carbonate.

It is possible that further size classification, size reduction and dissolution stages are employed to further extract magnesium from the mineral. The process as a whole may be operated in continuous manner or batch-wise. Each dissolution stage will incrementally reduce the magnesium content of the activated mineral.

As noted, in accordance with the invention the solid residue obtained following an initial dissolution stage is subjected to a particle size classification process to yield a (relatively) fine size fraction and a (relatively) coarse size fraction. The coarse size fraction has a mass median diameter ($D_{50}$) substantially greater than that of the fine particle size fraction, in the context of this invention at least 5 microns greater. At least part of the coarse particle size fraction is subjected to a particle size reduction process and then re-used in a dissolution stage. In one embodiment, at least part of the fine size fraction is also re-used in a dissolution stage different to the first dissolution stage.

In the context of the present invention mineral carbonation refers to an overall process in which carbon dioxide is reacted with magnesium from an activated magnesium silicate mineral feedstock to form magnesium carbonates and silica. Reference to activated magnesium silicate mineral refers to magnesium silicate mineral that has been activated by grinding or heating or both. In the invention reactions take place in aqueous liquids with the magnesium being leached out of the magnesium silicate into aqueous liquid in a dissolution stage and the magnesium carbonate precipitating out of at least one such liquid in a precipitation stage.

Reference to a dissolution stage refers to a process stage wherein (magnesium) metal ions are leached from the solid mineral into aqueous liquid. Reference to aqueous liquid includes liquids wherein water is the major constituent (greater than 50% by mass). The aqueous liquid may contain as a minor constituent (less than 50% by mass) dissolved species such as solid(s) or water miscible liquid(s). Sea water, brines and saline solutions are included herein. The reference to aqueous liquid also embraces gas species such as $CO_2$ and carbonate and bicarbonate ions dissolved in water. The reference to aqueous liquid further embraces an acid or acid salt dissolved in water. The aqueous liquid may contain a combination of components as herein described.

The aqueous liquid of course also contains undissolved particulate solid. The particulate solid comprises at least activated magnesium silicate mineral. That particulate solid in the aqueous liquid provides for the aqueous slurry. One or more other particulate solids may also be present in the aqueous liquid. The particulate solid will generally be in a suspended state within the aqueous liquid.

Reference to magnesium ion enriched carbonated aqueous liquids includes liquids where magnesium ions are in solution together with bicarbonate and carbonate counterions.

The $CO_2$-containing gas stream used in the initial dissolution step, and possibly subsequent dissolution step(s), may be from the same or different source. The gas stream may comprise a flue gas from a hydrocarbon combustion process or a $CO_2$ containing gas stream from a calcining process or it may be a relatively pure stream of $CO_2$ captured from a hydrocarbon combustion, oxidation or reforming process or from natural gas processing. Such streams may comprise $CO_2$ concentrations in the range 2-100% by volume. Capture processes are well known and may comprise the use of amines or other $CO_2$ absorbents or adsorbents or selective membranes to separate $CO_2$ from flue gas, or pre-combustion capture such as by so-called oxy-fuel combustion. The $CO_2$-containing gas stream used in a dissolution step may comprise $CO_2$ released and recycled from a precipitation step.

In an embodiment, instead of using a $CO_2$-containing gas stream, a liquid comprising an acid or acid salt may be used to further dissolve magnesium from the particle size reduced fraction to produce a magnesium ion enriched aqueous liquid. The acid or acid salt used in the acid treatment stage may be chosen from $HNO_3$, $H_2SO_4$, HCl, $NaHSO_4$, HBr, HF, HI, $HClO_4$, $H_3BO_3$, $H_3PO_4$, $CH_3COOH$, HCOOH or $HO_2C_2O_2H$.

Reference to a particle size reduction processes includes grinding processes, such as attrition grinding and other well-known grinding processes such as stirred mills or other mills incorporating grinding media.

Reference to size classification process include processes that use gravity or centrifugal forces to separate particles into different particle size fractions, including spiral classifiers, cyclones or hydrocyclones. Depending on the size classification process used, it may be necessary to formulate the coarse particle fraction into an aqueous slurry before carrying out the next dissolution stage. If the size classification process produces a slurry of coarse size particle fraction, that slurry may be used directly in the next dissolution stage.

Reference to a precipitation stage includes processes where magnesium ions in aqueous liquid are precipitated out of solution as solid magnesium carbonate or hydrated forms of magnesium carbonate, including hydromagnesite, dypingite and nesquehonite or mixtures thereof. When dissolution has been achieved by contacting a $CO_2$-containing gas stream with an aqueous slurry of activated mineral particles, precipitation may occur through changing process conditions such as pressure and temperature to induce precipitation. When dissolution has been achieved by using a liquid comprising an acid or acid salt, precipitation may occur through raising the liquid pH and contacting the liquid with a $CO_2$-containing gas stream.

Herein, unless otherwise clear from context, reference to magnesium carbonate includes magnesite and hydrated forms of magnesium carbonate including hydromagnesite, dypingite and nesquehonite or mixtures thereof.

Reference to a separator or separation process includes processes that use gravity, centrifugal forces or physical barriers such as membranes to substantially separate a slurry into a solid-rich stream and a solid-depleted stream. Such processes include settling tanks, hydrocyclones, filters, centrifuges and the like as well as combinations thereof.

The initial particulate solid used in as feedstock in the process of the invention comprises a magnesium silicate mineral such as olivine, serpentinite, dunite or mixtures thereof. The solid may be ground to particle sizes whereby the mass median diameter ($D_{50}$) is in the range 5-250 microns, preferably 10-150 microns. Before or after grinding, the mineral may be heated to activate it for dissolution. Some feedstocks may not require heating and may be sufficiently activated by grinding; thereby comprising an activated magnesium silicate mineral.

The magnesium silicate mineral may be activated by heating particulate mineral to elevated temperature, for example within the range 570° C.-700° C. to form an activated particulate solid comprising dehydroxylated magnesium silicate. The activated particulate solid comprises dehydroxylated magnesium silicate and is usually cooled to below 200° C. prior to mixing with aqueous liquid (e.g. water) to provide an aqueous slurry. In this embodiment, heat from the heated activated solid may be recovered for beneficial use, such as heating another process stream or producing steam for electrical power generation.

The magnesium depleted solid residue from any dissolution stage may be subjected to a wet magnetic separation process to extract an iron-rich portion as a valuable product before any subsequent processing.

The magnesium depleted solid residue from any dissolution stage may be recovered from the process and the silica therein may constitute another valuable product, whether subjected to magnetic separation or not. The magnesium depleted solid residue may be subjected to further chemical processing such as leaching by acid to further purify the silica product.

The pressures and temperatures of each stage of the process may be varied to optimise reactions in each step. The absolute pressures may be maintained in the range 5 kPa-20000 kPa and temperatures in the range 10° C.-200° C. Preferably the pressures in each dissolution stage are in the range 100-20000 kPa and temperatures are in the range 20° C.-185° C. Preferably the pressures in the precipitation stages are in the range 5-5000 kPa and temperatures are in the range 20° C.-150° C. When dissolution uses a solution of an acid or acid salt the pressure may be in the range 100-200 kPa and temperatures may be in the range 20° C.-120° C.

In one embodiment the invention provides a process in which a magnesium ion enriched carbonated liquid is produced by dissolving an activated magnesium silicate in one or more reactors fed by an input $CO_2$-containing gas stream near, at or above atmospheric pressure and thereafter, in a separate precipitation step, inducing a pH shift in the liquid by the removal of dissolved $CO_2$ through the application of a partial vacuum or sub-atmospheric pressure to the liquid thereby precipitating the magnesium carbonate.

In another embodiment the present invention provides a reactor system adapted to perform the processes of the present invention. The reactor system comprises one or more dissolution reactors, a precipitation reactor, a particle size classifier and a particle size reduction device. It is possible to implement the invention using a single dissolution reactor by recycling of the particle size reduced fraction to the dissolution reactor used in the initial dissolution stage.

In one embodiment slurry exiting a dissolution reactor is subjected to a separation process in a separator that substantially separates solids from liquids, thus separating the slurry into a stream comprising a magnesium ion enriched aqueous liquid and a stream comprising magnesium depleted solid residue. The solid residue can then be subjected to size classification and size reduction of the coarse fraction before being employed in a dissolution reaction. This may involve reformulating the particle size reduced fraction as an aqueous slurry. In an alternative embodiment, size classification takes place using the slurry exiting the dissolution reactor, i.e. without any separation of magnesium depleted solid residue from magnesium ion enriched aqueous liquid.

However, in another embodiment the system may comprise more than one of each type of reactor arranged in series or parallel configuration, along with pre-and post-processing unit operations such as liquid/solid separation processes. In this case the carbon dioxide liberated in respective degassing/precipitation reactors may be recycled to one or more dissolution reactors to enhance process efficiency. In embodiments a concentrated $CO_2$ stream can be reacted with activated mineral feedstock in separate reactors or recycled to one or more dissolution reactors, to form magnesium carbonate through subsequent degassing steps, thereby maximising the formation of magnesium carbonate as one valuable product of the invention.

In one embodiment the particle size classifier comprises one or more hydrocyclones.

In one embodiment the particle size classification process yields a coarse size fraction comprising particles whereby the mass median diameter is in the range 10-250 microns, preferably 15-100 microns, and a fine size fraction comprising particles whereby the mass median diameter is in the range 1-50 microns, preferably 2-20 microns, with the mass median diameter of the coarse fraction always greater than that of the fine fraction by at least 5 microns. In one embodiment the particle size classification process yields a coarse size fraction comprising particles whereby the mass median diameter is greater than the mass median diameter of the fine size fraction by 5-200 microns, preferably 15-150 microns.

In one embodiment the particle size reduction process reduces the mass median diameter of the particles in the coarse size fraction by 10-99%, preferably by 30-95%. Thus, a coarse size fraction with the mass median diameter of the particles being 100 microns would be reduced to having the mass median diameter of the particles in the range 1-90 microns, preferably 5-70 microns.

In one embodiment the particle size reduction process comprises at least one stirred mill with grinding media.

In an embodiment the fine size particle fraction obtained as a result of the size classification is fed to a second dissolution reactor where it is contacted with another $CO_2$-containing gas stream that has been compressed. In this dissolution reactor magnesium is further dissolved from the mineral. This dissolution reactor may be fed with a concentrated $CO_2$-containing stream and this will have the effect of further dissolving magnesium from the fine particles. The magnesium ion enriched carbonated aqueous liquid produced may then be delivered to a precipitation reactor. In an embodiment the magnesium ion enriched carbonated aqueous liquid will be combined with another magnesium ion enriched aqueous liquid from a separate dissolution stage. It is also possible that the magnesium ion enriched carbonated aqueous liquid obtained from the initial dissolution stage is delivered with the fine particle size reduced fraction to a subsequent dissolution reactor. The effect of dissolution will be to increase the overall magnesium ion concentration in solution.

The present invention may provide significant improvements over previous mineral carbonation processes, rendering the overall process more energetically and economically favourable than might have been expected and thus more competitive than the previous processes. The present invention may therefore provide a more favourable means of conversion of carbon dioxide into stable magnesium carbonates thereby enabling a reduction in the amount of carbon dioxide discharged to the atmosphere. Embodiments of the invention may be implemented under energetically beneficial operating conditions (of pressure and temperature) when compared with those conditions used conventionally for ex situ mineral carbonation. Embodiments of the invention may be implemented using carbon dioxide containing gas streams that contain acidic and/or other impurities at higher levels than conventional processes have otherwise allowed.

Embodiments of the invention will herein be described with reference to the following non-limiting examples.

Example 1

FIG. 1 shows a process flowsheet illustrating embodiments of the invention. For simplicity, intermediate heat exchangers, pumps and other process units have been omitted. It will be understood by those skilled in the art that such intermediate units are required at certain points in the process.

FIG. 1 shows a process with a single dissolution stage and a single precipitation stage. It shows an activation process (1) wherein magnesium silicate mineral feed is heated, to produce an activated magnesium silicate mineral, a slurry make-up tank (2) where water is mixed with the activated magnesium silicate mineral to provide an aqueous slurry of the activated mineral, a dissolution reactor (4) where the slurry is contacted with a $CO_2$-containing gas stream (3). Here the $CO_2$-containing gas stream comprises relatively pure $CO_2$ from a flue gas capture process. Here the magnesium silicate mineral feed has a mass median particle diameter of 37 microns. The slurry exiting the dissolution reactor (4) passes to a separator (5) that substantially separates the slurry into a magnesium ion enriched carbonated aqueous liquid and magnesium depleted solid residue. The solid residue is fed to a size classifier (6) which yields a coarse size particle stream, depicted as the underflow, and a fine size particle stream depicted as overflow. Here the coarse size particle stream has a mass median particle diameter of 50 microns and the fine size particle stream has a mass median diameter of 12 microns.

The coarse size particle stream is fed into a size reduction (milling) process (7) to provide a reduction of 80% in the mass median particle diameter thus reducing it to 10 microns and this particle size reduced stream is then returned to the dissolution reactor (4) for further dissolution of magnesium from the mineral.

The magnesium ion enriched carbonated aqueous liquid from the separator (5) is fed into a precipitation reactor (8) where precipitation of magnesium carbonate occurs.

Example 2

FIG. 2 shows a process flowsheet illustrating further embodiments of the invention. For simplicity, intermediate heat exchangers, pumps and other process units have been omitted. It will be understood by those skilled in the art that such intermediate units are required at certain points in the process.

FIG. 2 shows an activation process (1) wherein magnesium silicate mineral feed is ground to produce an activated magnesium silicate mineral having a mass median particle diameter of 20 microns, a slurry make-up tank (2) where water is mixed with the activated magnesium silicate mineral to provide an aqueous slurry of the activated mineral, a dissolution reactor (4) where the slurry is contacted with a $CO_2$-containing gas stream that has been compressed above atmospheric pressure (3). Here the $CO_2$-containing gas stream comprises a flue gas with a $CO_2$ concentration of 8% by volume. The slurry exiting the dissolution reactor (4) passes to a separator (5) that separates the slurry into a magnesium ion enriched carbonated aqueous liquid and magnesium depleted solid residue. The solid residue is fed to a size classifier (6) which yields a coarse size particle stream, depicted as the underflow, and a fine size particle stream depicted as overflow. Here the coarse size particle stream has a mass median particle diameter of 30 microns and the fine size particle stream has a mass median diameter of 6 microns.

The coarse size particle stream is fed into a size reduction (milling) process (7) to provide a reduction in the mass median particle diameter of 60%, thereby producing a size reduced stream with a mass median particle size of 12 microns and this particle size reduced stream is then returned to the slurry make-up tank (2) and thus subsequently into the first dissolution reactor (4) for further dissolution of magnesium from the mineral.

In this example the fine particle stream exiting the size classifier (6) constitutes a product stream that comprises silica-enriched solids. This stream may be further processed to produce high value products. In particular, it may be processed in a wet magnetic separator to remove an iron-rich fraction which may be a valuable product. The remaining silica-rich fraction after magnetic separation may be another valuable product or may be further processed or purified, for example by chemical treatment. Chemical treatment may include acid leaching of any remaining metals.

The magnesium ion enriched carbonated aqueous liquid obtained from the separator (5) is fed into a precipitation reactor (8) where precipitation of magnesium carbonate occurs. The outflow slurry from the precipitation reactor (8) is separated into solid-rich and liquid-rich streams in a separator (10). The solid rich stream constitutes a second product stream and here comprises the hydrated magnesium carbonate nesquehonite—another valuable product. Modification of process conditions here, such as temperature, may yield different forms of hydrated magnesium carbonate products.

In this example, $CO_2$ gas is released from the precipitation reactor (8), causing an increase in the liquid pH and inducing the carbonate precipitation from the magnesium ion enriched carbonated aqueous liquid. The released $CO_2$ is recompressed (9) and fed back to the dissolution reactor.

Example 3

FIG. 3 shows a process flowsheet illustrating further embodiments of the invention. For simplicity, intermediate heat exchangers, pumps and other process units have been omitted. It will be understood by those skilled in the art that such intermediate units are required at certain points in the process.

FIG. 3 shows an activation process (1) wherein magnesium silicate mineral feed is heated and ground, to produce an activated magnesium silicate mineral having a mass median particle diameter of 45 microns, a slurry make-up tank (2) where water is mixed with the activated magnesium silicate mineral to provide an aqueous slurry of the activated mineral, a first dissolution reactor (4) where the slurry is contacted with a $CO_2$-containing gas stream that has been compressed (3). Here the $CO_2$-containing gas stream comprises a flue gas from a hydrocarbon combustion process. The slurry exiting the dissolution reactor (4), comprising a magnesium ion enriched carbonated liquid and a magnesium depleted solid residue, passes to a hydrocyclone size classifier (6) which yields a coarse size particle stream, depicted as the underflow, and a fine size particle stream depicted as overflow. Here the coarse size particle stream has a mass median particle diameter of 80 microns and the fine size particle stream has a mass median diameter of 25 microns.

The coarse size particle stream is fed into a size reduction (milling) process (7) to provide a reduction of 50% in the mass median particle diameter thus reducing it to 40 microns and this particle size reduced stream is then returned to the slurry make-up tank (2) and thus subsequently fed back into the first dissolution reactor (4) for further dissolution of magnesium from the mineral.

The fine size particle stream is fed to a second dissolution reactor (4A) where it is contacted with another $CO_2$-containing gas stream that has been compressed (9). The $CO_2$ in this reactor is essentially pure and thus at a much higher concentration than the $CO_2$ in the first dissolution reactor (4). In the second dissolution reactor (4A) magnesium is further dissolved from the mineral. The slurry exiting the second dissolution reactor is fed into a separation unit (5) where aqueous liquid is separated from solid residue which comprises a silica rich product. The separated magnesium ion enriched carbonated aqueous liquid is fed into a series of precipitation reactors (8) where the precipitation of magnesium carbonate occurs.

In this example, $CO_2$ gas is released from the precipitation reactors (8) causing an increase in the liquid pH and inducing the carbonate precipitation from the magnesium ion enriched carbonated aqueous liquid. The released $CO_2$ is recompressed (9) and fed back to the second dissolution reactor (4A).

In this example a product stream is produced from the separator (5A) that comprises silica-enriched solids. This stream may be further processed to produce high value products. In particular, it may be processed in a wet magnetic separator to remove an iron-rich fraction which may be a valuable product. The remaining silica-rich fraction may be another valuable product or may be further processed or purified, for example by acid leaching of any remaining metals. A second product stream is produced from the precipitation reactors (8) by separating the slurry exiting the precipitation reactors (8) into a solid-rich stream and a liquid-rich stream in a separator (10). The solid-rich stream comprises hydrated magnesium carbonate and represents another valuable product.

Example 4

Tests were completed on slurries comprising particulate activated serpentinite mineral in water using commercial hydrocyclones to allow validation of an empirical prediction model for separation efficiency and to demonstrate the effectiveness of hydrocyclones for separating the slurry into a coarser fraction and a finer fraction as required by the invention.

The hydrocyclone rig contains 4 cyclones ranging from 1 to 4 inches in diameter, each with interchangeable overflow and underflow outlet sizes. This setup was selected to provide flexibility in separation conditions, to allow separation at different particle sizes, depending on the purpose of the separation and which could also be tailored based on experimental data gathered. An experimental plan for the hydrocyclones was developed to provide complete mapping of the operation range of the hydrocyclones, using the entire possible combination of cyclone sizes, overflow and underflow sizes, solids contents and feed flow rate. The effect of varying these parameters on the split ratio, concentration of overflow and underflow, average diameter of overflow and underflow as well as the entire particle size distribution was measured. A Plitt empirical model was used to predict the separation, and the experimental results were used to compare to the model predictions.

The cyclones supplied were found to provide very different separations, using the different sets of overflow and underflow sized supplied. Using one cyclone only could provide quite different separation in terms of particle size and solids contents, depending on the size of overflow and underflow outlet used as shown in FIG. 4, which shows the effect of cyclone overflow and underflow outlet sizes on mass median diameter ($d_{50}$) and solids contents of products for a 4-inch cyclone at 10 m³/hr and 28% by mass solids feed.

Using the entire range of process conditions with the different cyclone sizes and the range of flow rates provided even more different separations. The data gathered over the range of separation conditions also confirmed that in general, the model predicted well the separation obtained with all the variables. It was concluded that the model could be used to determine what operating conditions would provide a certain desired separation.

The ability to predict using the model was then tested in a separate set of tests with a different feed. This was conducted with the aim of separating a coarse feed slurry with a very wide particle size distribution to obtain an overflow (fine) fraction with at least 80% of the particles (p80) under 20 microns. Using these criteria, the model was used to successfully predict the best conditions for the separation. The tests used a 3-inch cyclone with 0.75-inch overflow size and 0.312-inch underflow size at a slurry flowrate of 7.5 m³/h and 28% solids content by mass. The separation met the target with a measured overflow size p80 of 12 microns. FIG. 5 shows the particle size distributions of the feed, the underflow and the overflow along with predicted underflow and overflow size distributions. The feed had a p80 of 29.8 microns, the overflow had a p80 of 12.1 microns and the underflow had a p80 of 55 microns. The close agreement between measured and predicted results show that it is possible in practice to reliably achieve a desired separation of coarse and fine particles using the hydrocyclone system in accordance with the invention.

The coarser stream (underflow) produced here had a p80 of 55 microns and could be subject to a re-grinding process prior to be recycled back to a dissolution reactor in accordance with the invention. Tests were performed on similar streams using a commercial stirred mill and a substantial reduction in particle size was successfully achieved. The finer stream could be directed to a second dissolution reactor in accordance with the invention.

What is claimed is:

1. An integrated process for carbon dioxide capture, sequestration and utilisation, which comprises:
    a) providing an aqueous slurry comprising an aqueous liquid and a particulate solid comprising an activated magnesium silicate mineral;
    b) in a dissolution stage, contacting a $CO_2$-containing gas stream with the aqueous slurry to dissolve magnesium from the mineral to provide a slurry comprising a magnesium ion enriched carbonated aqueous liquid and a magnesium depleted solid residue;
    c) subjecting at least part of the magnesium depleted solid residue from step b) to a particle size classification process that separates the magnesium depleted solid residue into a fine particle size fraction and a coarse particle size fraction;
    d) subjecting at least part of the coarse particle size fraction from step c) to a particle size reduction process to provide a particle size reduced fraction;
    e) providing an aqueous slurry comprising particle size reduced fraction from step d) and repeating step b), wherein this step e) does not include using fine particle size fraction from step c); and f) in a precipitation stage, precipitating magnesium carbonate from magnesium ions dissolved in b) and e).

2. The integrated process according to claim 1, wherein the magnesium ion enriched carbonated aqueous liquid is produced by dissolving the activated magnesium silicate mineral in one or more reactors fed by an input $CO_2$-containing gas stream near, at or above atmospheric pressure and thereafter, in a separate precipitation stage, inducing a pH shift in the liquid by the removal of dissolved $CO_2$ through the application of a partial vacuum or sub-atmospheric pressure to the liquid thereby precipitating the magnesium carbonate.

3. The integrated process according to claim 2, wherein the magnesium depleted solid residue from any dissolution stage is subjected to a wet magnetic separation process to extract an iron-rich portion therefrom before any subsequent processing.

4. The integrated process according to claim 2, wherein the $CO_2$-containing gas stream comprises a flue gas from a hydrocarbon combustion process, a calcining process or a chemical process.

5. The integrated process according to claim 2, wherein step b) is conducted in two or more dissolution reactors.

6. The integrated process according to claim 1, wherein the $CO_2$-containing gas stream comprises a flue gas from a hydrocarbon combustion process, a calcining process or a chemical process.

7. The integrated process according to claim 1 further comprising step e') in which at least part of the fine particle size fraction from step c) in the form of an aqueous slurry is used in a dissolution stage which comprises contacting a $CO_2$-containing gas stream with the aqueous slurry to dissolve magnesium from the fine particle size fraction to provide a slurry comprising a magnesium ion enriched carbonated aqueous liquid and a magnesium depleted solid residue, wherein the $CO_2$-containing gas stream used in this step has a higher $CO_2$ concentration than the $CO_2$-containing gas stream used in step b).

8. The integrated process according to claim 7, wherein step f) comprises precipitating magnesium carbonate from magnesium ions dissolved in steps b), e) and e').

9. The integrated process according to claim 7, wherein the size classification process comprises a process that uses gravity or centrifugal forces to separate particles into the different particle size fractions.

10. The integrated process according to claim 7, wherein the precipitation stage comprises a process where magnesium ions in aqueous liquid are precipitated out of solution as solid magnesium carbonate or hydrated forms of magnesium carbonate.

11. The integrated process according to claim 7, wherein the pressure in each dissolution stage is in the range 100-20000 kPa and the temperatures is in the range 20° C.–185° C.

12. The integrated process according to claim 1, wherein the size classification process comprises a process that uses gravity or centrifugal forces to separate particles into the different particle size fractions.

13. The integrated process according to claim 1, wherein the precipitation stage comprises a process where magnesium ions in aqueous liquid are precipitated out of solution as solid magnesium carbonate or hydrated forms of magnesium carbonate.

14. The integrated process according to claim 1, wherein the magnesium depleted solid residue from any dissolution stage is subjected to a wet magnetic separation process to extract an iron-rich portion therefrom before any subsequent processing.

15. The integrated process according to claim 1, wherein the pressure in each dissolution stage is in the range 100-20000 kPa and the temperature is in the range 20° C.–185° C.

16. The integrated process according to claim 1, wherein step b) is conducted in two or more dissolution reactors.

17. A reactor system adapted to perform the processes of claim 1, the reactor system comprising one or more dissolution reactors, one or more precipitation reactors, one or more particle size classifiers and one or more particle size reduction devices.

18. The reactor system according to claim 17 adapted such that slurry exiting the one or more dissolution reactors is subjected to a separation process in a separator that substantially separates solids from liquids thereby separating the slurry into a stream comprising the magnesium ion enriched aqueous liquid and a stream comprising the magnesium depleted solid residue.

19. The reactor system according to claim 17 which comprises a particle size classifier that comprises one or more hydrocyclones.

20. The reactor system according to claim 17, wherein particle size classifier yields a coarse particle size fraction comprising particles whereby the mass median diameter is in the range 10-250 microns and a fine particle size fraction comprising particles whereby the mass median diameter is in the range 1-50 microns, with the mass median diameter of the coarse fraction always greater than that of the fine fraction by at least 5 microns.

* * * * *